(12) United States Patent
De Prato

(10) Patent No.: US 7,370,618 B2
(45) Date of Patent: May 13, 2008

(54) INTERNAL COMBUSTION ENGINE WITH FIVE VALVES PER CYLINDER

(76) Inventor: Bruno De Prato, Via Oleandri 16, I-20070 Dresano (Milano) (IT)

( * ) Notice: Subject to any disclaimer, the term of this patent is extended or adjusted under 35 U.S.C. 154(b) by 0 days.

(21) Appl. No.: 11/671,959

(22) Filed: Feb. 6, 2007

(65) Prior Publication Data

US 2007/0181093 A1 Aug. 9, 2007

(30) Foreign Application Priority Data

Feb. 7, 2006 (IT) .......................... TO2006A0082

(51) Int. Cl.
*F01L 1/18* (2006.01)
(52) U.S. Cl. ............... 123/90.4; 123/193.5; 123/193.6; 123/279
(58) Field of Classification Search ............. 123/90.16, 123/90.2, 90.39, 90.4, 90.44, 193.5, 193.6, 123/279, 308, 315, 432
See application file for complete search history.

(56) References Cited

U.S. PATENT DOCUMENTS

| 5,868,113 | A | 2/1999 | Yoshikawa |
| 6,705,261 | B2 * | 3/2004 | Haghgooie et al. ...... 123/90.23 |

FOREIGN PATENT DOCUMENTS

| DE | 197 16 642 | 10/1998 |
| DE | 39 43 816 | 1/2001 |
| DE | 103 04 167 | 8/2004 |
| EP | 1 253 304 | 4/2002 |
| EP | 1 348 854 | 10/2003 |

OTHER PUBLICATIONS

EP Search Report, Application No. EP 07 10 0419, dated Jun. 18, 2007.

* cited by examiner

*Primary Examiner*—Ching Chang
(74) *Attorney, Agent, or Firm*—Patterson & Sheridan, LLP

(57) ABSTRACT

Otto cycle internal combustion engine, comprising a cylinder block including at least one cylinder having a longitudinal axis, a piston movable within said cylinder and having a recess open on a head surface of the piston, a head fastened to said cylinder block and having a surface facing the cylinder, three intake valves and two exhaust valves movable along respective rectilinear directions, a combustion chamber delimited at one side by a portion of the surface of the head facing the cylinder and, at the other side, by the surface of said recess of the piston. The directions of motion of the valves are parallel to each other, the surface of the head facing the cylinder is planar and orthogonal to the directions of motion of the valves and the combustion chamber is obtained exclusively in the piston.

7 Claims, 3 Drawing Sheets

INTERNAL COMBUSTION ENGINE WITH FIVE VALVES PER CYLINDER

CROSS-REFERENCE TO RELATED APPLICATIONS

This application claims benefit of Italian patent application number TO2006A000082, filed Feb. 7, 2006, which is herein incorporated by reference.

BACKGROUND OF THE INVENTION

1. Field of the Invention

The present invention relates to an Otto cycle internal combustion engine with five valves per cylinder. The present invention relates in particular to a combustion chamber configuration and the related distribution architecture associated thereto.

2. Description of the Related Art

An internal combustion engine with five valves per cylinder is described for example in U.S. Pat. No. 5,868,113 in the name of Yamaha. This document describes an engine having a lens-shaped combustion chamber able to obtain a high compression ratio and to reduce the possibility of knocking. The engine described in the Yamaha US Patent includes a head having three intake valve and two exhaust valves. The intake and exhaust valves are arranged with an acute angle relative to the axis of the cylinder. Consequently, the combustion chamber is obtained for a relevant portion in the head.

The sum of the experiences collected with this configuration shows that engines of the type described in the aforesaid US patent are provided with a high volumetric efficiency, whereto however corresponds a low thermodynamic efficiency.

SUMMARY OF THE INVENTION

The present invention has the object of providing an internal combustion engine with five valves per cylinder which has high volumetric and thermodynamic efficiency.

According to the present invention, said object is achieved by an engine having the characteristics set out in the claims.

In the solution according to the present invention, the valves are all mutually parallel, the head is flat and the combustion chamber is obtained exclusively in the piston crown. The combustion chamber preferably has the shape of a hemisphere or of a portion of sphere. With respect to the centre of the piston, the combustion chamber is preferably in slightly offset position towards the side of the head in which are positioned the intake valves.

BRIEF DESCRIPTION OF THE DRAWINGS

Additional characteristics of the present invention and the advantages deriving from this new architecture shall become readily apparent in the detailed description that follows, provided purely by way of non limiting example, with reference to the accompanying drawings, in which.

DETAILED DESCRIPTION

Figure 1:
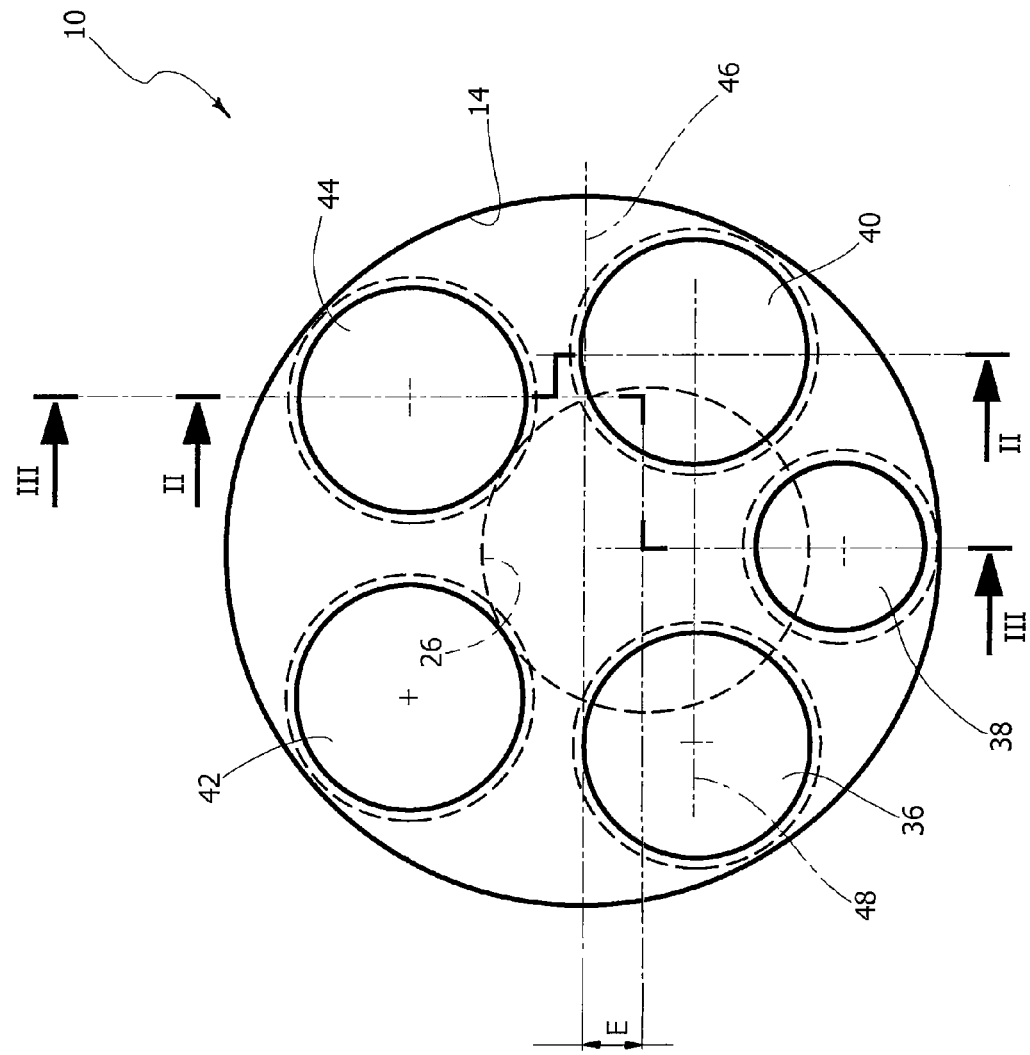
FIG. 1 is a schematic plan view of an engine according to the present invention.
Figure 2:
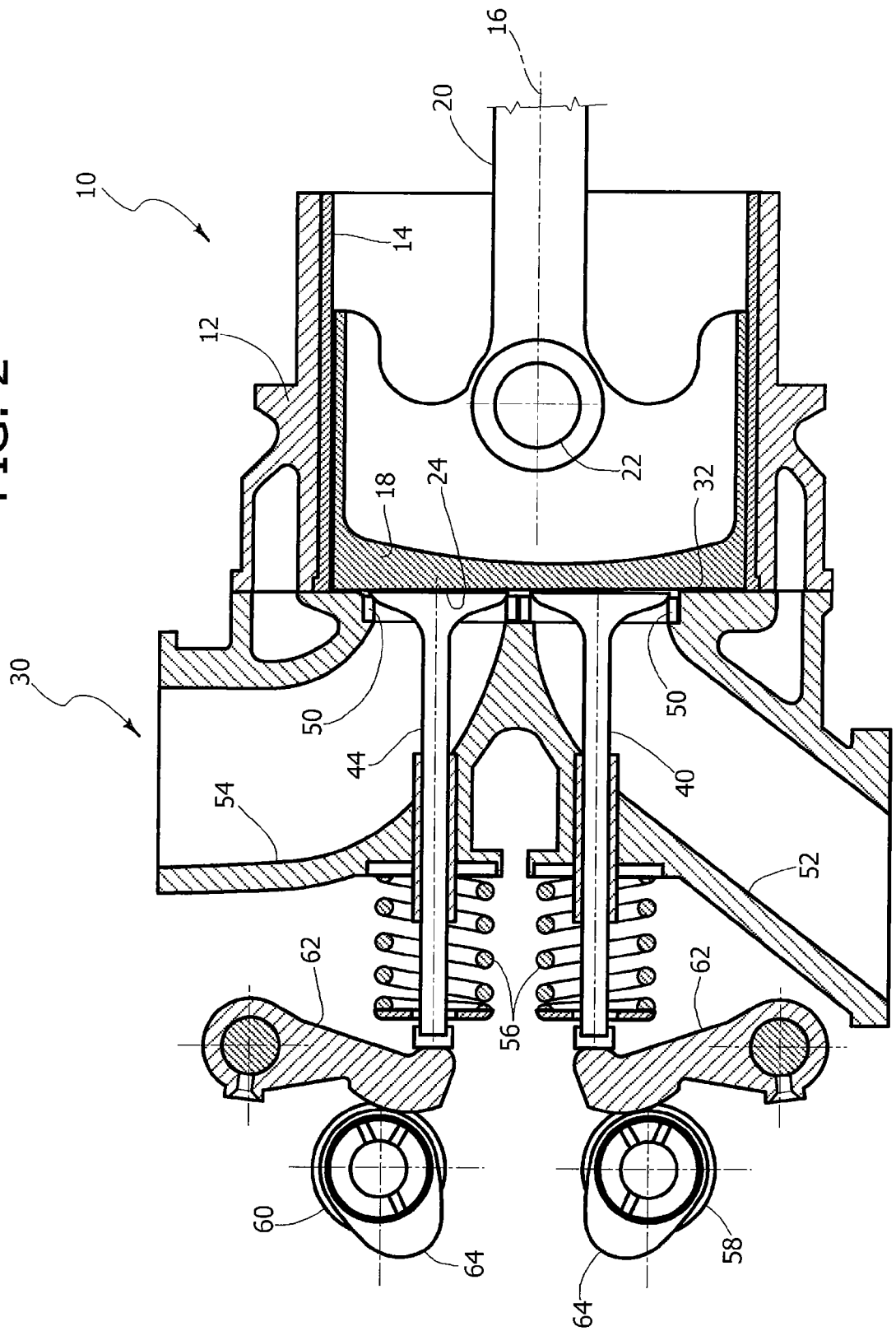
FIG. 2 is a section according to the line II-II of FIG. 1.
Figure 3:
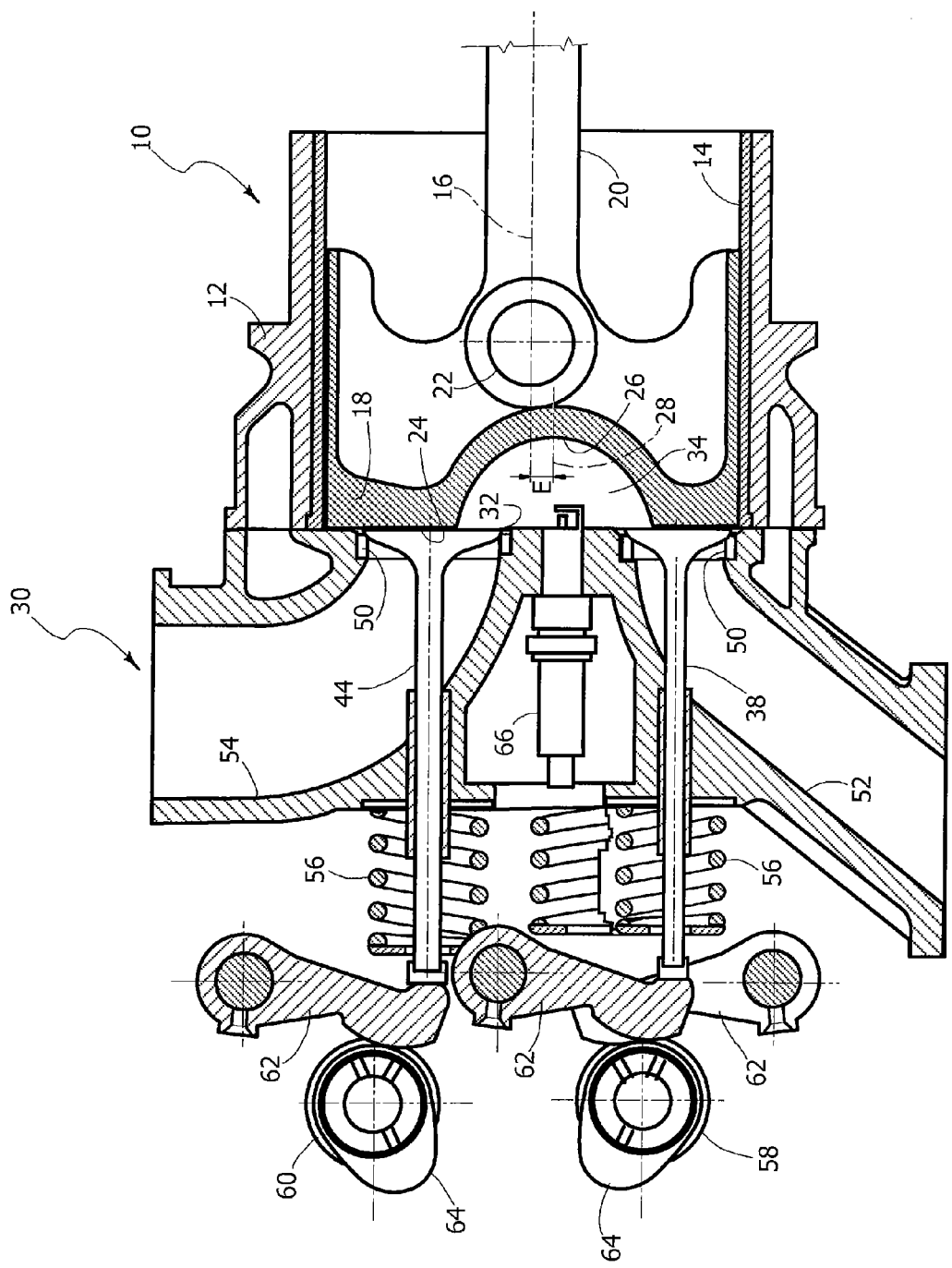
FIG. 3 is a section according to the line III-III of FIG. 1.

In FIGS. 1 through 3, the numeral 10 designates a portion of an internal combustion engine according to the present invention. The invention is described with reference to a single cylinder of an engine. The invention can be applied both to single-cylinder engine and to multi-cylinder engines with various configurations (in line, boxer, V, etc.).

The present invention relates principally to the configuration of the combustion chamber and the related timing architecture. Consequently, only the upper part of the engine 10 is illustrated herein. The components of the engine that are not illustrated herein can be considered to be of a conventional type.

The engine 10 comprises a cylinder block 12 in which is formed at least one cylinder 14 having a longitudinal axis 16.

In the cylinder 14 is alternatively movable a piston 18 that is articulated in conventional fashion to a connecting rod 20 by means of a piston pin 22. The piston 18 has a head surface 24 that is planar and orthogonal to the longitudinal axis 16 of the cylinder 14.

In the piston 18 is formed a recess 26 open on the head surface 24 and having a hemispherical configuration or a sphere portion configuration. The longitudinal axis of symmetry of the recess 26, designated by the numeral 28 in FIG. 3, is in eccentric position relative to the longitudinal axis 16 of the cylinder 14. The eccentricity between the axes 16 and 28 is designated by the reference E in FIGS. 1 and 3.

The engine 10 comprises a head 30 fastened to the cylinder block 12. The head 30 has a surface 32 facing the cylinder 14 that is planar and orthogonal to the longitudinal axis 16.

When the piston 18 is in its top dead centre, the head surface 24 of the piston 18 is almost in contact with the planar surface 32 of the head 30. The portion of the surface 32 facing the recess 26 and the recess surface 26 define, in the top dead centre of the piston 18, a combustion chamber 34. The volume of the combustion chamber 34 is substantially equal to the volume of the recess 26 formed in the piston 18, so it can briefly be said that the combustion chamber 34 is obtained exclusively in the piston 18. In FIG. 3, the numeral 66 designates a spark plug whose electrodes conventionally project into the combustion chamber 34.

With reference to FIG. 1, the head 30 is provided with three intake valves 36, 38, 40 and with two exhaust valves 42, 44. Taking as a reference a plane orthogonal to the plane of representation of FIG. 1 and orthogonal to the axis of rotation 46, the three intake valves comprise two lateral valves 36, 40 positioned at opposite parts relative to said plane and a central valve 38 aligned relative to said plane. The two lateral valves 36, 40 have the same diameter and they have their centres aligned on an axis 48 parallel to the axis of rotation 46. The central valve 38 can have a smaller diameter than the diameter of the lateral vales 36, 40 and it is positioned with its centre distanced from the axis 48 that joins the centres of the two lateral valves 36, 40.

The two exhaust valves 42, 44 have the same diameter, preferably equal to the diameter of the two lateral intake valves 36, 40.

In FIG. 1, it is shown that the recess 26 defining the combustion chamber is offset towards the side of the head where the intake valves 36, 38, 40 are positioned.

With reference to FIGS. 2 and 3, the intake and exhaust valves are conventional mushroom valves, each of which co-operates with a respective valve seat 50, inserted or integral. Each valve is associated to a respective intake conduit 52 or exhaust conduit 54. The intake conduits 52 associated to the lateral intake valves 36, 40 are provided with a respective injector (not shown). Preferably, the intake conduit associated to the central intake valve 38 has no injector.

Conventionally, each valve is associated to elastic elements 56 which tend to maintain the valve in closed position. The opening of the valves is actuated by two camshafts 58, 60. The camshaft 58 actuates the opening of the intake valves 36, 38 and 40 and the camshaft 60 actuates the opening of the exhaust valves 42, 44. In the illustrated embodiment, each valve is associated to a respective intermediate actuating member 62 articulated to the head around an axis parallel to the axes of the camshafts 58, 60. Each intermediate actuating member 62 is interposed between one end of a valve and a respective cam formation 64 of the respective camshaft 58, 60. As shown in FIG. 3, the intermediate actuating member 62 associated to the central intake valve 38 is situated, relative to the camshaft 59, at the opposite side with respect to the intermediate actuating member 62 associated to a respective intermediate actuating member 62 articulated to the head around an axis parallel to the axes of the camshafts 58, 60. Each intermediate actuating member 62 is interposed between an end of a valve and a respective cam formation 64 of the respective camshaft 58, 60. FIG. 3 shows that the intermediate actuating member 62 associated to the central intake valve 38 is situated, relative to the camshaft 58, at the opposite side with respect to the intermediate actuating member 62 associated to the lateral intake valves 36, 40, to compensate the offset of the central valve 38 relative to the lateral valves 36, 40.

According to an advantageous characteristic of the present invention, the central valve 38 is actuated by a cam 64 having a differentiated phasing diagram and lift law from those of the cams 64 that actuate the two lateral valves 36, 40.

According to a particularly important specific aspect of the present invention, the valve 36, 38, 40, 42, 44 are all movable along respective directions that are parallel to each other and parallel to the longitudinal axis 16 of the cylinder 14. This specific characteristic allows to maintain perfectly planar the surface 32 of the head 30 facing the cylinder 14 and, consequently, it allows to obtain the combustion chamber 34 exclusively in the crown of the piston 18.

The five valve timing arrangement according to the present invention, with differentiated phasing among the three intake valves, in combination with the combustion chamber obtained in the crown of the piston and slightly offset towards the intake side, allows to obtain thermodynamic efficiency levels that heretofore had never been achieved by Otto cycle engines.

Said object is pursued through the accurate search for the cleanest possible configuration of the combustion chamber, eliminating insofar as possible the areas, albeit limited, of incomplete or imperfect combustion, such as those normally created by the valve niches, which, by creating an obstacle to the spread of the flame front, are at the basis of the substantial failure of the thermodynamics with five valve timing developed heretofore.

The central intake valve 38 has the task of achieving nearly all the phase called "crossover" with respect to the exhaust valve. The purpose is to have a single, relatively deep valve niche, in order to maintain as sharp and uninterrupted as possible the configuration of the squish band around the combustion chamber.

The intake conduit corresponding to the central intake valve preferably has not injectors, in order to avoid the emission of unburned hydrocarbons during the crossover phase. The injectors are positioned in the conduits of the two lateral intake valves 36, 40, which operate with minimal or no crossover with respect to the exhaust valves 42, 44 and hence with niches that marginally cut into the squish band that encompasses the combustion chamber.

The differentiated phasing between the central intake valve 38 and the two lateral intake valves 36, 40 enables to maximise not only volumetric efficiency, but also thermodynamic efficiency, whilst minimising also the environmental impact of a vehicle equipped with such an engine, because a crossover phase obtained with air only eliminates the discharge of unburned hydrocarbons into the exhaust, containing specific consumption as well.

By virtue of the characteristics described above, the thermodynamics of the present invention enable to obtain perfectly clean configurations even with very high compression ratios, above 12:1, even using current commercial, 95 octane petrol. This factor translates into thermodynamic efficiency levels that are not found in current series production.

The solution according to the present invention enables to adopt strongly oversquare bore/stroke ratios, without losing anything in terms of cleanliness and compactness of the combustion chamber.

To assure the cleanliness and the compactness of the combustion chamber, fundamental characteristics for the containment of polluting emissions, most last-generation Otto cycle engines currently in production have the bore smaller than the stroke (undersquare ratio) with consequent not marginal loss of mechanical efficiency because, in order to contain the vertical development of the engines, the tendency is to adopt connecting rod whose distance between the centre of the small end and the centre of the big end, is far lower than twice the value of the stroke, a condition that generates a significant increase in internal friction.

The solution according to the present invention enables significantly to increase the efficiency of the engine, associating a good volumetric efficiency to high thermodynamic and mechanical efficiencies, with the prospective of obtaining specific powers around 100 HP/liter, with lower specific consumption and polluting emissions (HC, CO e CO2) than those of the best current engines.

The offsetting of the combustion chamber relative to the longitudinal axis of the cylinder reduces the incidence of the recess at the median axis of the piston and hence of the piston pin, in order to position the piston pin in the highest possible position. The offsetting of the combustion chamber also reduces the incidence of the area of the niches of the intake valves relative to the squish area obtained around the combustion chamber. This enables to obtain a combustion chamber with a cleaner profile and hence to contain the phenomena of emission of unburned hydrocarbons in the exhaust, also containing specific consumption.

Naturally, without altering the principle of the invention, the construction details and the embodiments may be widely varied from what is described and illustrated purely by way of example herein, without thereby departing from the scope of the invention, as defined by the appended claims.

The invention claimed is:

1. An Otto cycle internal combustion engine, comprising:
 a cylinder block including at least one cylinder having a longitudinal axis,
 a piston movable within said cylinder and having a recess open on a head surface of the piston,
 a head fastened to said cylinder block and having a surface facing said cylinder, three intake valves and two exhaust valves movable along respective rectilinear directions and co-operating with respective valve seats situated in said head, and a combustion chamber delimited at one side by a portion of the surface of the head facing the cylinder and, at the other side, by the surface of said recess of the piston wherein the directions of motion of said valves are parallel to each other, the surface of the head facing the cylinder is planar and orthogonal to the directions of motion of the valves and the combustion chamber is obtained exclusively in the piston.

2. The engine as claimed in claim 1, wherein the recess has hemispherical or sphere portion shape.

3. The engine as claimed in claim 2, wherein the longitudinal axis of symmetry of the recess is offset relative to the longitudinal axis of the cylinder towards the side of the head in which the intake valves are housed.

4. The engine as claimed in claim 1, wherein the three intake valves comprise two lateral valves and a central valve having a lesser diameter than the diameter of the lateral valves.

5. The engine as claimed in claim 4, wherein the three intake valves are actuated by a camshaft having a cam for actuating the central valve with a differentiated phasing diagram and lift law from those of the cams that actuate the two lateral valves.

6. The engine as claimed in claim 4, wherein the intake valves are associated to respective intake conduits and in that the intake conduit associated to the central intake valve has no injector.

7. The engine as claimed in claim 6, wherein the opening law of the central intake valve achieves a crossover phase with the opening phase of the exhaust valves.

* * * * *